(12) United States Patent  
Sampathkumar et al.

(10) Patent No.: US 12,694,436 B2  
(45) Date of Patent: Jul. 28, 2026

(54) METHOD AND SYSTEM FOR PERSONALIZED OUTFIT COMPATIBILITY PREDICTION

(71) Applicant: Tata Consultancy Services Limited, Mumbai (IN)

(72) Inventors: Vivek Bangalore Sampathkumar, Bangalore (IN); Jayavardhana Rama Gubbi Lakshminarasimha, Bangalore (IN); Gaurab Bhattacharya, Bangalore (IN); Bagya Lakshmi Vasudevan, Chennai (IN); Arpan Pal, Kolkata (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 76 days.

(21) Appl. No.: 18/666,920

(22) Filed: May 17, 2024

(65) Prior Publication Data

US 2024/0420215 A1 Dec. 19, 2024

(30) Foreign Application Priority Data

Jun. 16, 2023 (IN) .............................. 202321041042

(51) Int. Cl.  
*G06Q 30/00* (2023.01)  
*G06Q 30/0601* (2023.01)

(52) U.S. Cl.  
CPC ................................ *G06Q 30/0631* (2013.01)

(58) Field of Classification Search  
CPC .................................................. G06Q 30/0631  
See application file for complete search history.

(56) References Cited

U.S. PATENT DOCUMENTS

| | | | |
|---|---|---|---|
| 9,965,705 B2 | 5/2018 | Chen et al. | |
| 2021/0035187 A1 | 2/2021 | Ning et al. | |
| 2021/0256588 A1* | 8/2021 | Moosaei | G06Q 30/0631 |

FOREIGN PATENT DOCUMENTS

| | | |
|---|---|---|
| CN | 110619082 B | 5/2022 |
| CN | 115082142 A | 9/2022 |

OTHER PUBLICATIONS

J. Wang, X. Cheng, R. Wang and S. Liu, "Learning Outfit Compatibility with Graph Attention Network and Visual-Semantic Embedding," 2021 IEEE International Conference on Multimedia and Expo (ICME), Shenzhen, China, 2021, pp. 1-6, doi: 10.1109/ICME51207.2021.9428401. (Year: 2021).*

* cited by examiner

*Primary Examiner* — Anand Loharikar  
(74) *Attorney, Agent, or Firm* — Finnegan, Henderson, Farabow, Garrett & Dunner, LLP

(57) ABSTRACT

Unlike visual similarity, visual compatibility is a complex concept. Existing approaches for outfit compatibility prediction does not focus on methods with personalization. The present disclosure proposes a novel approach to model the user's preference for different styles. The outfit compatibility prediction module is a critical component of an outfit recommendation system. An outfit is said to be compatible if all the items are visually compatible and match the user's preferences. The present disclosure represents the outfit as a graph and uses Graph Neural Network (GNN) with attention mechanism to capture the inter-relationship between the items. A graph read-out layer generates the final outfit embedding. The proposed approach efficiently models the preferences of the users for different styles. Finally, the outfit compatibility score is generated by computing the similarity between the outfit embedding and the user embedding.

6 Claims, 6 Drawing Sheets

100

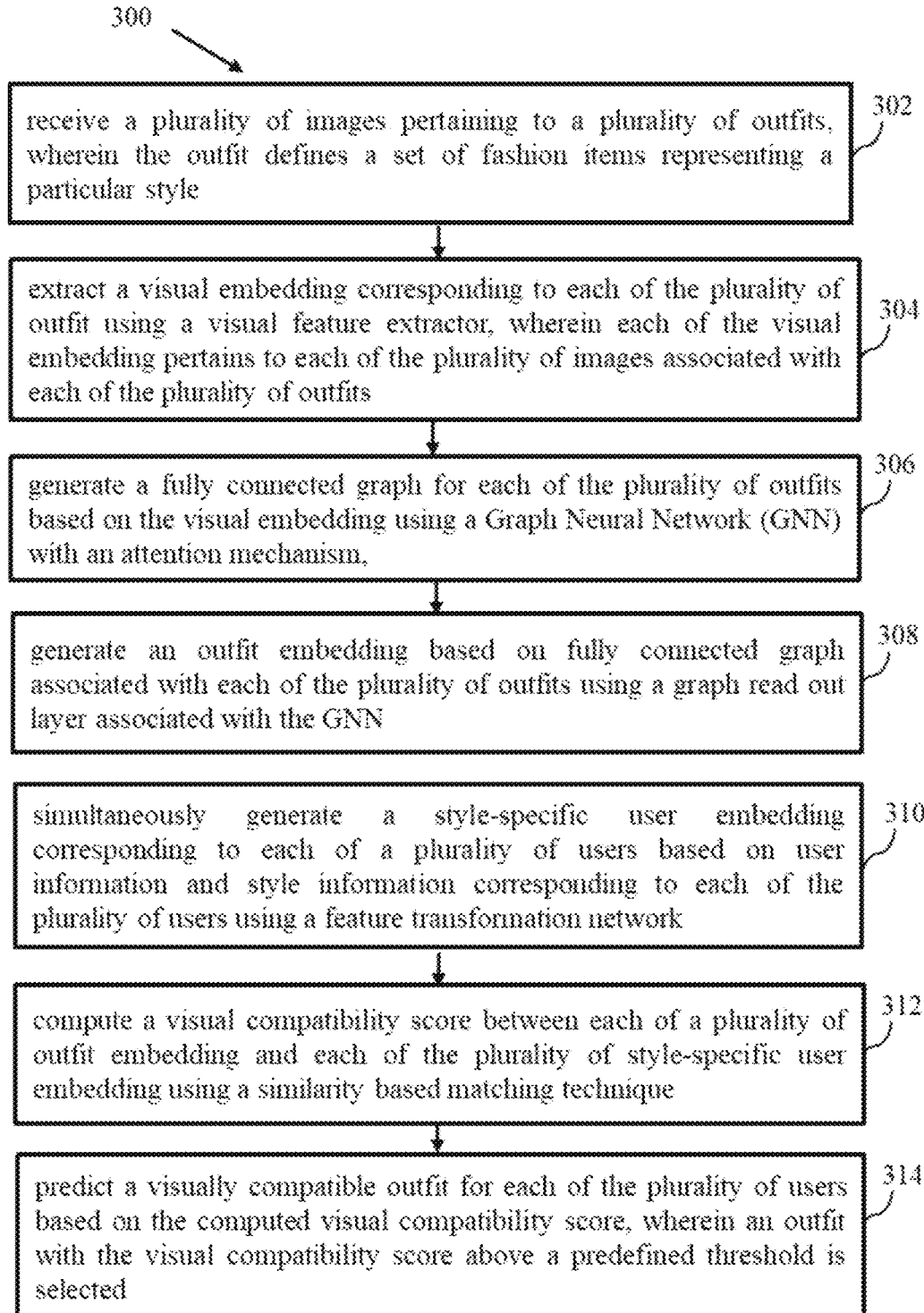

300 receive a plurality of images pertaining to a plurality of outfits, wherein the outfit defines a set of fashion items representing a particular style — 302 extract a visual embedding corresponding to each of the plurality of outfit using a visual feature extractor, wherein each of the visual embedding pertains to each of the plurality of images associated with each of the plurality of outfits — 304 generate a fully connected graph for each of the plurality of outfits based on the visual embedding using a Graph Neural Network (GNN) with an attention mechanism, — 306 generate an outfit embedding based on fully connected graph associated with each of the plurality of outfits using a graph read out layer associated with the GNN — 308 simultaneously generate a style-specific user embedding corresponding to each of a plurality of users based on user information and style information corresponding to each of the plurality of users using a feature transformation network — 310 compute a visual compatibility score between each of a plurality of outfit embedding and each of the plurality of style-specific user embedding using a similarity based matching technique — 312 predict a visually compatible outfit for each of the plurality of users based on the computed visual compatibility score, wherein an outfit with the visual compatibility score above a predefined threshold is selected — 314

FIG. 3

METHOD AND SYSTEM FOR PERSONALIZED OUTFIT COMPATIBILITY PREDICTION

PRIORITY CLAIMS

This U.S. patent application claims priority under 35 U.S.C. § 119 from Indian application No. 202321041042, filed on Jun. 16, 2023. The entire contents of the aforementioned application are incorporated herein by reference.

TECHNICAL FIELD

The disclosure herein generally relates to the field of e-commerce and, more particularly, to a method and system for personalized outfit compatibility prediction.

BACKGROUND

Recommendation systems (RecSys) play a vital role in ecommerce platforms. A significant percentage of sales on these platforms is based on recommendations. RecSys improve user's shopping experience by helping them to find relevant products. User's feedback and purchase history help RecSys to recommend suitable products to the users. Recently, RecSys have been adapted for various business domains, e.g., video streaming services, fashion, grocery, etc. In fashion e-commerce platforms, recommendation systems also recommend fashion outfits apart from complementary and substitute products. A fashion outfit is a set of fashion items or apparel that are worn together and represent a particular style.

Unlike visual similarity, visual compatibility is a complex concept in outfit recommendation. Determining visual similarity between fashion items involves comparing visual attributes of the items, e.g., the color of the shirt and trousers. Visual similarity helps in fashion item search and substitute item recommendation. Visual compatibility uses latent concepts to determine the compatibility between fashion items. In the case of fashion outfits, all the items should be visually compatible with each other.

Existing approaches for outfit compatibility prediction can be grouped into two types: (i) methods without personalization and (ii) methods with personalization. The main aim of methods without personalization is to learn an optimal representation of the items or outfits. The methods in this group ignore individual users' preferences and implicitly capture population preferences. There are some approaches for personalization too. However, those conventional personalization based methods fail to capture relationship between fashion items.

SUMMARY

Embodiments of the present disclosure present technological improvements as solutions to one or more of the above-mentioned technical problems recognized by the inventors in conventional systems. For example, in one embodiment, a method for personalized outfit compatibility prediction is provided. The method includes receiving, by one or more hardware processors, a plurality of images pertaining to a plurality of outfits, wherein the outfit defines a set of fashion items representing a particular style. Further, the method includes extracting via the one or more hardware processors, a visual embedding corresponding to each of the plurality of outfit using a visual feature extractor, wherein each of the visual embedding pertains to each of the plurality of images associated with each of the plurality of outfits. Furthermore, the method includes generating via the one or more hardware processors, a fully connected graph for each of the plurality of outfits based on the visual embedding using a Graph Neural Network (GNN) with an attention mechanism. Furthermore, the method includes generating via the one or more hardware processors, an outfit embedding based on fully connected graph associated with each of the plurality of outfits using a graph read out layer associated with the GNN. Furthermore, the method includes simultaneously generating via the one or more hardware processors, a style-specific user embedding corresponding to each of a plurality of users based on user information and style information corresponding to each of the plurality of users using a feature transformation network. Furthermore, the method includes computing via the one or more hardware processors, a visual compatibility score between each of a plurality of outfit embedding and each of the plurality of style-specific user embedding using a similarity based matching technique. Finally, the method includes predicting via the one or more hardware processors, a visually compatible outfit for each of the plurality of users based on the computed visual compatibility score, wherein an outfit with the visual compatibility score above a predefined threshold is selected.

In another aspect, a system for personalized outfit compatibility prediction is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a plurality of images pertaining to a plurality of outfits, wherein the outfit defines a set of fashion items representing a particular style. Further, the one or more hardware processors are configured by the programmed instructions to extract a visual embedding corresponding to each of the plurality of outfit using a visual feature extractor, wherein each of the visual embedding pertains to each of the plurality of images associated with each of the plurality of outfits. Furthermore, the one or more hardware processors are configured by the programmed instructions to generate a fully connected graph for each of the plurality of outfits based on the visual embedding using a Graph Neural Network (GNN) with an attention mechanism. Furthermore, the one or more hardware processors are configured by the programmed instructions to generate an outfit embedding based on fully connected graph associated with each of the plurality of outfits using a graph read out layer associated with the GNN. Furthermore, the one or more hardware processors are configured by the programmed instructions to simultaneously generate a style-specific user embedding corresponding to each of a plurality of users based on user information and style information corresponding to each of the plurality of users using a feature transformation network. Furthermore, the one or more hardware processors are configured by the programmed instructions to compute a visual compatibility score between each of a plurality of outfit embedding and each of the plurality of style-specific user embedding using a similarity based matching technique. Finally, the one or more hardware processors are configured by the programmed instructions to predict a visually compatible outfit for each of the plurality of users based on the computed visual compatibility score, wherein an outfit with the visual compatibility score above a predefined threshold is selected.

In yet another aspect, a computer program product including a non-transitory computer-readable medium having embodied therein a computer program for personalized outfit compatibility prediction is provided. The computer readable program, when executed on a computing device, causes the computing device to receive a plurality of images pertaining to a plurality of outfits, wherein the outfit defines a set of fashion items representing a particular style. Further, the computer readable program, when executed on a computing device, causes the computing device to extract a visual embedding corresponding to each of the plurality of outfit using a visual feature extractor, wherein each of the visual embedding pertains to each of the plurality of images associated with each of the plurality of outfits. Furthermore, the computer readable program, when executed on a computing device, causes the computing device to generate a fully connected graph for each of the plurality of outfits based on the visual embedding using a Graph Neural Network (GNN) with an attention mechanism. Furthermore, the computer readable program, when executed on a computing device, causes the computing device to generate an outfit embedding based on fully connected graph associated with each of the plurality of outfits using a graph read out layer associated with the GNN. Furthermore, the computer readable program, when executed on a computing device, causes the computing device to simultaneously generate a style-specific user embedding corresponding to each of a plurality of users based on user information and style information corresponding to each of the plurality of users using a feature transformation network. Furthermore, the computer readable program, when executed on a computing device, causes the computing device to compute a visual compatibility score between each of a plurality of outfit embedding and each of the plurality of style-specific user embedding using a similarity based matching technique. Finally, the computer readable program, when executed on a computing device, causes the computing device to predict a visually compatible outfit for each of the plurality of users based on the computed visual compatibility score, wherein an outfit with the visual compatibility score above a predefined threshold is selected.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is an exemplary flow diagram illustrating a processor implemented method for personalized outfit compatibility prediction implemented by the system of FIG. 1 according to some embodiments of the present disclosure.

DETAILED DESCRIPTION

Figure 1:
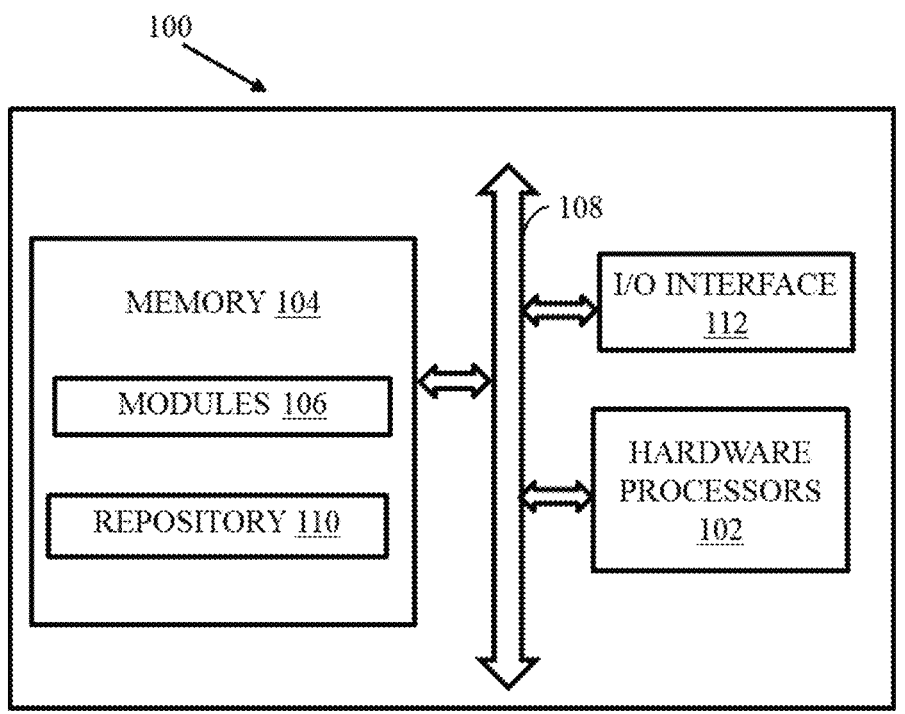
FIG. 1 is a functional block diagram of a system for personalized outfit compatibility prediction, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Unlike visual similarity, visual compatibility is a complex concept. Determining visual similarity between fashion items involves comparing visual attributes of the items, e.g., the color of the shirt and trousers. Visual similarity helps in fashion item search and substitute item recommendation. Visual compatibility uses latent concepts to determine the compatibility between fashion items. In the case of fashion outfits, all the items should be visually compatible with each other.

Existing approaches for outfit compatibility prediction can be grouped into two types: (i) methods without personalization and (ii) methods with personalization. The main aim of methods without personalization is to learn an optimal representation of the items or outfits. The methods in this group ignore individual users' preferences and implicitly capture population preferences. There are some approaches for personalization too. However, those conventional personalization based methods fail to capture relationship between fashion items. To overcome the challenges of the conventional approaches, embodiments herein provide a relative score based method and system for personalized outfit compatibility prediction. The present disclosure proposes an approach to model the user's preference for different styles. The outfit compatibility prediction module is a critical component of an outfit recommendation system. An outfit is said to be compatible if all the items are visually compatible and match the user's preferences. Various factors such as demography, season, occasion, and user preferences, affect the outfit compatibility score. The outfit compatibility is subjective, i.e., an outfit liked by one user need not necessarily be preferred by another user. The use of population preferences for outfit recommendations leads to sub-optimal results. Therefore, it is necessary to consider the user's preferences for compatibility scoring. The present disclosure represents the outfit as a graph and uses graph neural network (GNN) with an attention mechanism (e.g., dot attention, multi-head attention, and self attention) to capture the inter-relationship between the items. A graph read-out layer generates the final outfit embedding. The proposed approach efficiently models the preferences of the users for different styles. Finally, the outfit compatibility score is generated by computing the similarity between the outfit embedding and the style-specific user embedding.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 is a functional block diagram of a system 100 for personalized outfit compatibility prediction, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
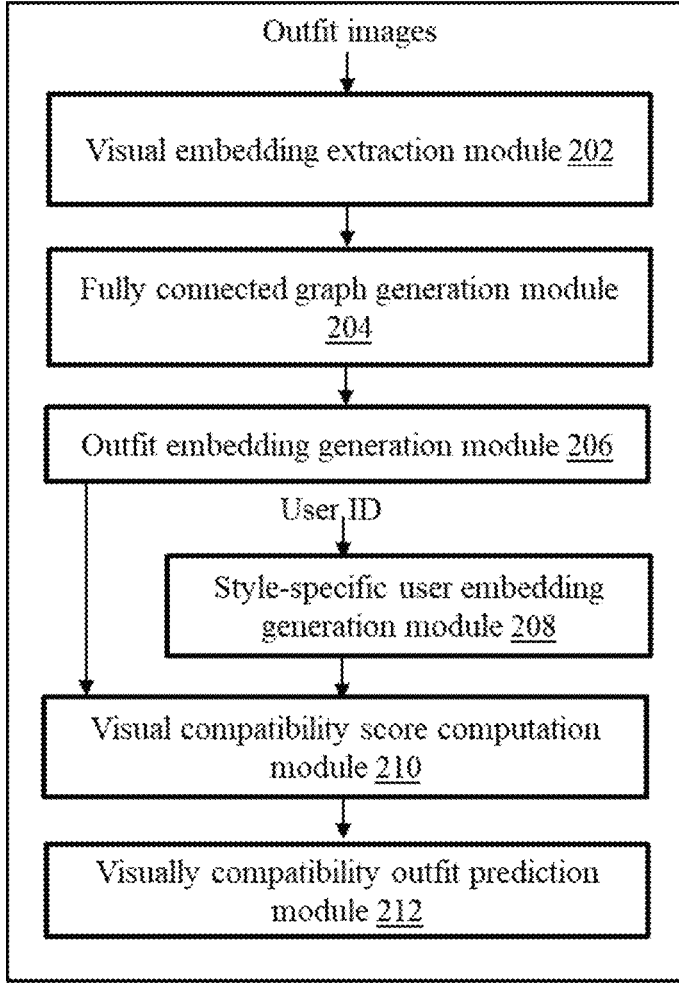
FIG. 2 illustrates a functional architecture of the system of FIG. 1, for personalized outfit compatibility prediction, in accordance with some embodiments of the present disclosure.

The plurality of modules 106 include programs or coded instructions that supplement applications or functions performed by the system 100 for personalized outfit compatibility prediction. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for personalized outfit compatibility prediction. In an embodiment, the modules 106 include a visual embedding extraction module 202 (shown in FIG. 2), a Fully connected graph generation module 204 (shown in FIG. 2), an outfit embedding generation module 206 (shown in FIG. 2), a style-specific user embedding generation module 208 (shown in FIG. 2), a visual compatibility score computation module 210 (shown in FIG. 2) and a visually compatibility outfit prediction module 212 (shown in FIG. 2). In an embodiment, FIG. 2 illustrates a functional architecture of the system of FIG. 1, for personalized outfit compatibility prediction, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such an external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS).

FIG. 3 is an exemplary flow diagram illustrating a method 300 for personalized outfit compatibility prediction implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

Figure 4:
FIG. 4 illustrates some exemplary outfit images for the processor implemented method for personalized outfit compatibility prediction implemented by the system of FIG. 1 according to some embodiments of the present disclosure.

At step 302 of the method 300, the one or more hardware processors 102 are configured by the programmed instructions to receive a plurality of images pertaining to a plurality of outfits. The outfit defines a set of fashion items representing a particular style as shown in FIG. 4. Now referring to FIG. 4, outfit-1 defines a set of fashion item and outfit-2 defines another set of fashion items. For example, an outfit is mathematically represented as $O=\{I_1, I_2, \ldots I_N\}$, with N fashion items, $I_i \in R^{H \times W \times 3}$, where i=1 to N. Here, H and W represents height and width of the image. Let $U_l$ represents the $l^{th}$ user in the system.

At step 304 of the method 300, the visual embedding extraction module 202 executed by one or more hardware processors 102 is configured by the programmed instructions to extract a visual embedding $(x_i)$ corresponding to each of the plurality of outfit using a visual feature extractor. The visual feature extractor can be a Convolution Neural Network (CNN) or a vision transformer. Each of the visual embedding pertains to each of the plurality of images associated with each of the plurality of outfits. The visual feature extractor is trained using a plurality of positive outfits and a plurality of negative outfits corresponding to each of the plurality of users until a minimum ranking loss is obtained. For example, ResNet-18 without classification layer is used in present disclosure. The output of global average pooling is fed to a Fully Connected (FC) to obtain the visual embedding of the item. The visual embedding is mathematically represented as given in equation (1), where $f_v$ is the feature extractor, $x_i \in R^{d_{emb}}$, wherein $d_{emb}$ is the dimension of visual embedding.

$$x_i = f_v(I_i; \theta_{f_v}) \qquad (1)$$

At step 306 of the method 300, the fully connected graph generation module 204 executed by the one or more hardware processors 102 is configured by the programmed instructions to generate a fully connected graph (G=V, E) for each of the plurality of outfits based on the visual embedding using a Graph Neural Network (GNN) with an attention mechanism. Here, V represents nodes and E represents edges.

Figure 5:
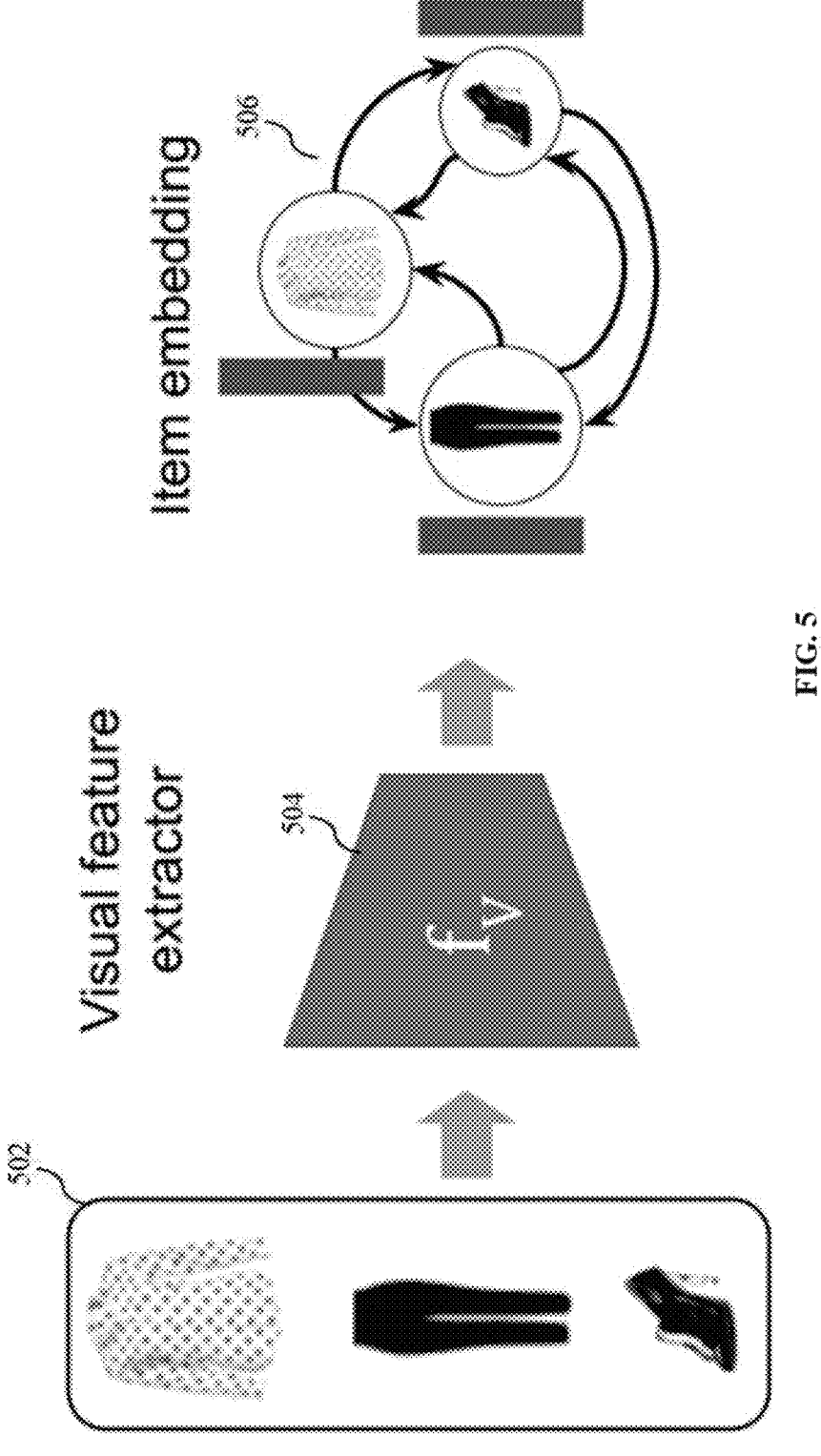
FIG. 5 is a functional block diagram illustrating a fully connected graph generation from input outfit images for the processor implemented method for personalized outfit compatibility prediction implemented by the system of FIG. 1 according to some embodiments of the present disclosure.

For example, the GNN with an attention mechanism can be one of a dot attention mechanism, a multi-head attention mechanism, and a self-attention mechanism. The GNN with an attention mechanism is trained using a plurality of positive outfits and a plurality of negative outfits corresponding to each of the plurality of users until a minimum ranking loss is obtained. For example, the ranking loss can be a Bayesian personalized ranking loss, a triplet ranking loss and a margin loss. The fully connected graph includes a plurality of nodes and a plurality of edges connecting the plurality of nodes, wherein each of the plurality of nodes represents a visual embedding of fashion items in the outfit as shown in FIG. 5. Now referring to FIG. 5, the outfit 502 is given as input to the visual feature extractor 504. The visual embedding obtained from the visual feature extractor 504 is converted into the fully connected graph 506.

Let, X={$x_1$; $x_2$; . . . $x_N$}, X∈ $R^{d_{emb}}$ represent the embedding of nodes. In an embodiment, the dot attention mechanism is used to update the embeddings of the nodes. DOT-GNN uses a dot attention mechanism to capture visual interaction between the items. The updated node embedding is given by equation (2), where $X^{new}$ is the updated embedding of nodes and $\theta_{gnn}$ represents the trainable parameter of DOT-GAT, $\widehat{G_O}$ represents the graph with updated node embedding. The updated equation for DOT-GNN is given in equation (3). Now referring to equation (3), $N_i$ represents the set of neighbor nodes of i. GNN with attention mechanism provides different weightage (0≤$a_{ij}$≤1) to neighbor nodes of a node. This attention plays a vital role in capturing asymmetrical importance of items in the outfit.

$$X^{new} = GNN_{DOT}(X, G_O, \theta_{gnn}) \qquad (2)$$

$$x_i^{new} = \sum_{j \in N_i} \alpha_{ij} x_j \qquad (3)$$

$$\alpha_{ij} = softmax(e_{ij}, \dim = 1)$$

$$e_{ij} = (W_{ix_i})^T (W_{jx_j})$$

$$\theta_{gnn} = W_i \in R^{d_{emb} \times d_{emb}}, W_j \in R^{d_{emb} \times d_{emb}}$$

At step 308 of the method 300, the outfit embedding generation module 206 executed by the one or more hardware processors 102 is configured by the programmed instructions to generate an outfit embedding based on fully connected graph associated with each of the plurality of outfits using a graph read out layer associated with the GNN. The output of the graph read out layer is given in equations (4) and (5). Here, q∈ $R^{d_{emb}}$ represents the outfit embedding and the $f_r$ represents the read-out function.

$$q = f_r(X^{new}, \widehat{G_O}) \qquad (4)$$

$$f_r(X^{new}, \widehat{G_O}) = \frac{1}{N} \sum_{i=1}^{N} x_i^{new}; \text{ mean read} - \text{out} \qquad (5)$$

In the present disclosure, each user is associated with an embedding $u_l \in R^{d_{emb}}$. To capture users' preferences for different styles or contexts, the user embedding is transformed using the feature transformation network $f_t$. The feature transformation block transforms the user embedding using 'K' learnable style embedding $c_k \in R^{d_{emb}}$, yielding 'K' style conditioned embedding $u_{lk} \in R^{d_{emb}}$ for each user, wherein $u_{lk} = f_t(u_l, c_k; \theta_{f_t})$; for k=1 to K, $f_t(u_l, c_k) = \omega^T(u_l + c_k) + b$. Here, $\theta_{f_t} = \{\omega \in R^{d_{emb} \times d_{emb}}, b \in R^{d_{emb}}\}$ represents the trainable parameters. Both user ($u_l$) and style embedding ($c_k$) are randomly initialized. Then, with the aid of implicit feedback of the users on the outfit, these embedding are updated using Bayesian personalized ranking (BPR) loss. In an embodiment, the dimension of user embedding ($u_l$) and style embedding ($c_k$) are set equal to the dimension of outfit embedding (q), i.e., $d_{emb}$=256. The number of style embedding was set as K=64.

At step 310 of the method 300, the style-specific user embedding generation module 208 executed by the one or more hardware processors 102 is configured by the programmed instructions to simultaneously generate a style-specific user embedding corresponding to each of a plurality of users based on user information and style information corresponding to each of the plurality of users using a feature transformation network. For example, the feature transformation network can be a fully connected neural network. The feature transformation network is trained using a plurality of positive outfits and a plurality of negative outfits corresponding to each of the plurality of users until a minimum ranking loss is obtained.

At step 312 of the method 300, the visual compatibility score computation module 210 executed by the one or more hardware processors 102 is configured by the programmed instructions to compute a visual compatibility score between each of a plurality of outfit embedding and each of the plurality of style-specific user embedding using a similarity based matching technique. For example, the similarity based matching techniques includes cosine similarity and Euclidean distance. The compatibility score $$s_o^{u_l}$$

of an outfit (o) to a user ($u_l$) is computed by taking the cosine similarity (CS) between outfit embedding (q) and style-conditioned user embedding ($u_{lk}$), given by equation (6)

$$s_o^{u_l} = \sum_{k=1}^{K} CS(u_{lk}, q) \qquad (6)$$

Training: Let $$O_l^+ = \{o_1, o_2, \dots\}$$

represents the positive outfit set (outfit liked by user $u_l$) and $$O_l^-$$

represents the negative outfit set. Considering the mini-batch B with M samples, each sample represents a tuple ($o_p$, $o_n$, u) where $$o_p \in O_l^+ \text{ and } o_p \in O_l^-$$

are positive and negative outfit for user $u_l$. The proposed model is trained in an end-to-end manner. First, the compatibility scores for positive and negative outfits are generated. Then using Bayesian personalized ranking loss, the entire network along with the user and style embeddings are updated. The training loss is given by equation (7). Here, $$s_{o_p}^u$$

represents compatibility score of the positive outfit and $$s_{o_n}^u$$

represents compatibility score of the negative outfit.

$$L_{total} = \frac{1}{M} \sum_{(o_p, o_n, u) \in B} \log\left(1 + \exp\left(-\left(s_{o_p}^u - s_{o_n}^u\right)\right)\right) \qquad (7)$$

Figure 6:
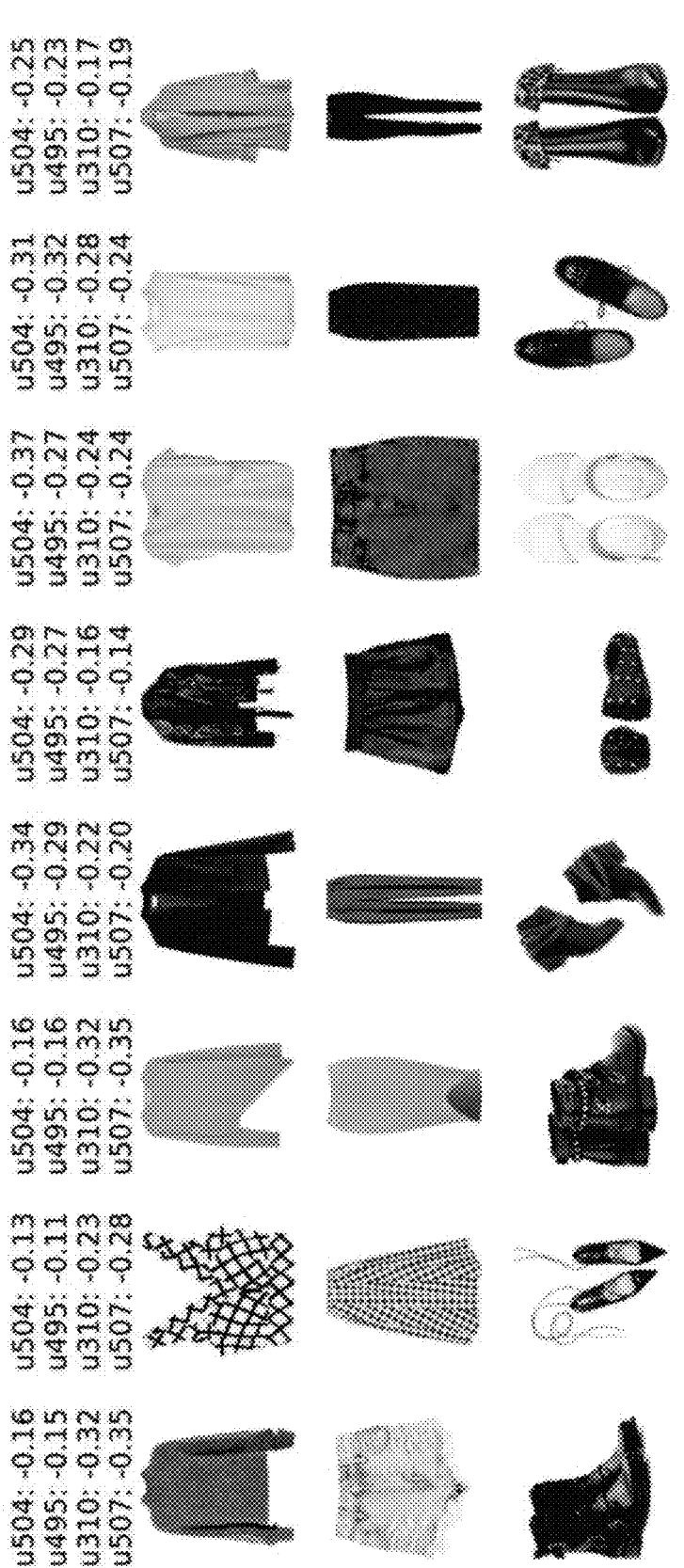
FIG. 6 is an experimental result showing visual compatibility score for a plurality of users implemented by the system of FIG. 1 according to some embodiments of the present disclosure.

FIG. 6 is an experimental result showing visual compatibility score for a plurality of users implemented by the system of FIG. 1 according to some embodiments of the present disclosure. Now referring to FIG. 6, the visual compatibility score for users u504, u495, u310 and u507 for various outfits are illustrated. It has been observed that the visual compatibility score for the user pairs (u504, u495) and (u310, u507) are similar.

At step 314 of the method 300, the visually compatibility outfit prediction module 216 executed by the one or more hardware processors 102 is configured by the programmed instructions to predict a visually compatible outfit for each of the plurality of users based on the computed visual compatibility score, wherein an outfit with the visual compatibility score above a predefined threshold is selected.

Dataset: In an embodiment, Polyvore-U dataset is used for the experimentation and validation for the method (as disclosed in Z. Lu, Y. Hu, Y. Jiang, Y. Chen, and B. Zeng, "Learning binary code for personalized fashion recommendation," in Proceedings of the IEEE/CVF Conference on Computer Vision and Pattern Recognition, 2019, pp. 10 562-10 570). The details of the dataset are given in Table I. The dataset contains outfits collected by multiple users ('U'). Here, 'U' indicates the number of users. Polyvore-630 and 53 contain outfits of fixed length. Polyvore-519 and 32 contain outfits of variable lengths. Polyvore-53 and 32 datasets are used for evaluation in the cold start setting.

TABLE 1

| Dataset | Users | Outfit size | Split | Items | Outfit |
|---------|-------|-------------|-------|-------|--------|
| Polyvore-630 | 630 | Fixed | Train | 159729 | 127326 |
| | | | Test | 45505 | 23054 |
| Polyvore-53 | 53 | Fixed | Train | 20230 | 10712 |
| | | | Test | 4437 | 1944 |
| Polyvore-519 | 519 | Variable | Train | 146475 | 83416 |
| | | | Test | 39085 | 14654 |
| Polyvore-32 | 32 | Variable | Train | 14594 | 5133 |
| | | | Test | 2797 | 898 |

Metrics: For evaluation, the present disclosure utilizes the ranking metrics like (i) Normalized Discounted Cumulative Gain (NDCG) and (ii) Area Under the ROC curve (AUC). The test set is ranked in descending order using the predicted compatibility score, and the ranking metrics AUC and NDCG are used for evaluation. Two settings were considered for evaluation, details given in Table II. During training, the ratio of positive to negative samples is 1:1. For evaluation, this ratio is set to 1:10. In protocol 1, negative outfits are randomly created by sampling fashion items of different categories (i.e., top, bottom, and shoe). In protocol 2, outfits of other users are sampled to create negative samples for a given user. ResNet-18, pre-trained on ImageNet is used for feature extraction. The user and style embedding are randomly initialized. The present disclosure is trained using an Adam optimizer with a learning rate of 1e-4. The images are normalized with mean and standard deviation same as that used for pretraining of ResNet-18. For data augmentation, the present disclosure perform random horizontal flip during training. The training mini-batch size is set to 64.

TABLE II

| Protocol | Train | | Test | |
| | Negative outfit | Ratio | Negative outfit | Ratio |
|----------|-----------------|-------|-----------------|-------|
| Protocol 1 | Random online | 1:1 | Random fixed | 1:10 |
| Protocol 2 | Hard online | 1:1 | Hard fixed | 1:10 |

The present disclosure handles new users without retraining the entire network. It is common for an e-commerce platform to encounter new users. The scenario is referred to as a new user cold start problem where the RecSys has to cater to new users with little or no interaction data (purchase, viewed, add to cart). The outfit compatibility prediction module which is an integral part of the fashion outfit recommendation system should be able to handle new users.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of personalized outfit compatibility prediction. The present disclosure represents the outfit as a graph and uses GNN with an attention mechanism to capture the relationship between fashion items. A graph read-out layer is used to generate the final outfit embedding. Style-specific user embeddings are generated using the proposed feature transformation network. The outfit compatibility score is generated by computing the similarity between the outfit embedding and the style-specific user embeddings.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, via one or more hardware processors, a plurality of images pertaining to a plurality of outfits, wherein the outfit defines a set of fashion items representing a particular style;

extracting, via the one or more hardware processors, a visual embedding corresponding to each of the plurality of outfit using a visual feature extractor, wherein each of the visual embedding pertains to each of the plurality of images associated with each of the plurality of outfits;

generating, via the one or more hardware processors, a fully connected graph for each of the plurality of outfits based on the visual embedding using a Graph Neural Network (GNN) with an attention mechanism;

generating, via the one or more hardware processors, an outfit embedding based on fully connected graph associated with each of the plurality of outfits using a graph read out layer associated with the GNN, wherein the visual feature extractor, the GNN with the attention mechanism and feature transformation network are trained using a plurality of positive outfits and a plurality of negative outfits corresponding to each of the plurality of users until a minimum ranking loss is obtained, and a dot attention mechanism updates the embeddings of the nodes and DOT-GNN uses the dot attention mechanism to capture visual interaction between items;

simultaneously generating, via the one or more hardware processors, a style-specific user embedding corresponding to each of a plurality of users based on user information and style information corresponding to each of the plurality of users using the feature transformation network, wherein the user embedding using multiple learnable style embeddings, producing style-conditioned embeddings for each user;

computing, via the one or more hardware processors, a visual compatibility score between each of a plurality of outfit embedding and each of the plurality of style-specific user embedding using a similarity based matching technique; and predicting, via the one or more hardware processors, a visually compatible outfit for each of the plurality of users based on the computed visual compatibility score, wherein an outfit with the visual compatibility score above a predefined threshold is selected.

2. The processor implemented method of claim 1, wherein the fully connected graph comprises a plurality of nodes and a plurality of edges connecting the plurality of nodes, wherein each of the plurality of nodes represents a visual embedding of fashion items in the outfit.

3. A system comprising:

at least one memory storing programmed instructions; one or more Input/Output (I/O) interfaces; and one or more hardware processors operatively coupled to the at least one memory, wherein the one or more hardware processors are configured by the programmed instructions to:

receive a plurality of images pertaining to a plurality of outfits, wherein the outfit defines a set of fashion items representing a particular style;

extract a visual embedding corresponding to each of the plurality of outfit using a visual feature extractor, wherein each of the visual embedding pertains to each of the plurality of images associated with each of the plurality of outfits;

generate a fully connected graph for each of the plurality of outfits based on the visual embedding using a Graph Neural Network (GNN) with an attention mechanism;

generate an outfit embedding based on fully connected graph associated with each of the plurality of outfits using a graph read out layer associated with the GNN, wherein the visual feature extractor, the GNN with the attention mechanism and feature transformation network are trained using a plurality of positive outfits and a plurality of negative outfits corresponding to each of the plurality of users until a minimum ranking loss is obtained, and a dot attention mechanism updates the embeddings of the nodes and DOT-GNN uses the dot attention mechanism to capture visual interaction between items;

simultaneously generate a style-specific user embedding corresponding to each of a plurality of users based on user information and style information corresponding to each of the plurality of users using a feature transformation network, wherein the user embedding using multiple learnable style embeddings, producing style-conditioned embeddings for each user;

compute a visual compatibility score between each of a plurality of outfit embedding and each of the plurality of style-specific user embedding using a similarity based matching technique; and predict a visually compatible outfit for each of the plurality of users based on the computed visual compatibility score, wherein an outfit with the visual compatibility score above a predefined threshold is selected.

4. The system of claim 3, wherein the fully connected graph comprises a plurality of nodes and a plurality of edges connecting the plurality of nodes, wherein each of the plurality of nodes represents a visual embedding of fashion items in the outfit.

5. One or more non-transitory machine-readable information storage mediums comprising one or more instructions which when executed by one or more hardware processors cause:

receiving a plurality of images pertaining to a plurality of outfits, wherein the outfit defines a set of fashion items representing a particular style;

extracting a visual embedding corresponding to each of the plurality of outfit using a visual feature extractor, wherein each of the visual embedding pertains to each of the plurality of images associated with each of the plurality of outfits;

generating a fully connected graph for each of the plurality of outfits based on the visual embedding using a Graph Neural Network (GNN) with an attention mechanism;

generating an outfit embedding based on fully connected graph associated with each of the plurality of outfits using a graph read out layer associated with the GNN, wherein the visual feature extractor, the GNN with the attention mechanism and feature transformation network are trained using a plurality of positive outfits and a plurality of negative outfits corresponding to each of the plurality of users until a minimum ranking loss is obtained, and a dot attention mechanism updates the embeddings of the nodes and DOT-GNN uses the dot attention mechanism to capture visual interaction between items;

simultaneously generating a style-specific user embedding corresponding to each of a plurality of users based on user information and style information corresponding to each of the plurality of users using a feature transformation network, wherein the user embedding using multiple learnable style embeddings, producing style-conditioned embeddings for each user;

computing a visual compatibility score between each of a plurality of outfit embedding and each of the plurality of style-specific user embedding using a similarity based matching technique; and predicting a visually compatible outfit for each of the plurality of users based on the computed visual compatibility score, wherein an outfit with the visual compatibility score above a predefined threshold is selected.

6. The one or more non-transitory machine-readable information storage mediums of claim 5, wherein the fully connected graph comprises a plurality of nodes and a plurality of edges connecting the plurality of nodes, wherein each of the plurality of nodes represents a visual embedding of fashion items in the outfit.

* * * * *